(12) United States Patent
Weber et al.

(10) Patent No.: US 7,673,840 B2
(45) Date of Patent: Mar. 9, 2010

(54) SUPPORTING ARM FOR A PROJECTION APPARATUS AND PRESENTATION APPARATUS HAVING A SUPPORTING ARM

(75) Inventors: Reinhard Weber, Minden (DE); Friedrich Korte, Minden (DE)

(73) Assignee: VS Vereinigte Spezialmoebelfabriken GmbH & Co. KG, Tauberbischofsheim (DE)

( * ) Notice: Subject to any disclaimer, the term of this patent is extended or adjusted under 35 U.S.C. 154(b) by 0 days.

(21) Appl. No.: 12/236,955

(22) Filed: Sep. 24, 2008

(65) Prior Publication Data

US 2010/0006732 A1  Jan. 14, 2010

(30) Foreign Application Priority Data

Jul. 14, 2008  (DE) .............. 10 2008 033 060

(51) Int. Cl.
*E04G 3/00* (2006.01)
(52) U.S. Cl. .............................. 248/292.13
(58) Field of Classification Search ............ 248/291.1, 248/292.11, 292.13, 292.14, 297.1, 274.1; 353/79, 70
See application file for complete search history.

(56) References Cited

U.S. PATENT DOCUMENTS

| | | | | |
|---|---|---|---|---|
| 5,941,497 | A * | 8/1999 | Inoue et al. ............ | 248/514 |
| 6,082,552 | A * | 7/2000 | Pollock et al. ........... | 211/18 |
| 6,179,426 | B1 | 1/2001 | Rodriguez, Jr. | |
| 6,394,609 | B1 | 5/2002 | Rodriguez, Jr. | |
| 6,394,610 | B2 | 5/2002 | Rodriguez, Jr. | |
| 6,485,146 | B2 | 11/2002 | Rodriguez, Jr. | |
| 6,520,646 | B2 | 2/2003 | Rodriguez, Jr. | |
| 6,530,664 | B2 | 3/2003 | Vanderwerf et al. | |
| 6,568,814 | B2 | 5/2003 | Rodriguez, Jr. | |
| 6,604,829 | B2 | 8/2003 | Rodriguez, Jr. | |
| 6,732,988 | B2 * | 5/2004 | Ihalainen et al. ........ | 248/276.1 |
| 7,367,376 | B2 * | 5/2008 | Llagostera Forns ....... | 160/66 |
| 2005/0023424 | A1 * | 2/2005 | Chow et al. ............ | 248/292.11 |
| 2008/0173777 | A1 * | 7/2008 | Yamamoto et al. ........ | 248/274.1 |

FOREIGN PATENT DOCUMENTS

| | | |
|---|---|---|
| DE | 202007010920 U1 | 11/2007 |
| DE | 202008002222 U1 | 5/2009 |
| EP | 2025532 A2 | 2/2009 |
| WO | 2004062278 A1 | 7/2004 |

* cited by examiner

*Primary Examiner*—Ramon O Ramirez
(74) *Attorney, Agent, or Firm*—Laurence A. Greenberg; Werner H. Stemer; Ralph E. Locher

(57) ABSTRACT

A supporting arm for a projection apparatus has first and second arm sections and an articulation apparatus therebetween for interconnecting the arm sections. The projection apparatus can be fastened on a free end of the second arm section. The articulation apparatus permits the second arm section to rotate relative to the first arm section between a first position, in which the longitudinal axes of the arm sections run substantially mutually parallel, and a second position, in which the longitudinal axes of the arm sections run substantially mutually at right angles. A spring apparatus is coupled to the arm sections and has a spring force selected to compensate for a weight force of the second arm section and of the projection apparatus fastened thereon over substantially an entire rotational excursion of the second arm section relative to the first arm section. A presentation apparatus having the supporting arm is also provided.

17 Claims, 4 Drawing Sheets

US 7,673,840 B2

SUPPORTING ARM FOR A PROJECTION APPARATUS AND PRESENTATION APPARATUS HAVING A SUPPORTING ARM

CROSS-REFERENCE TO RELATED APPLICATIONS

This application claims the priority, under 35 U.S.C. § 119, of German Patent Application DE 10 2008 033 060.4, filed Jul. 14, 2008; the prior application is herewith incorporated by reference in its entirety.

BACKGROUND OF THE INVENTION

Field of the Invention

The present invention relates to a supporting arm for a projection apparatus, such as a video projector, for example. The invention also relates to a presentation apparatus having a supporting arm.

Various presentation systems, which are known from the prior art, include a projection panel and a video projector directed at the panel. In many cases, the video projector can be adjusted between an operating position and a non-operating position.

Thus, for example, German Utility Model DE 20 2007 010 920 U1 has disclosed a presentation system in which the video projector is fastened on the projection panel through a supporting arm in such a way that it can be pivoted to the side about a vertical axis.

International Publication No. WO 2004/062278 A1, corresponding to U.S. Pat. Nos. 6,604,829; 6,568,814; 6,530,664; 6,520,646; 6,485,146; 6,394,610; 6,394,609; and 6,179,426, demonstrates an integrated projection system with a projection panel and a projector fastened thereon through the use of a supporting arm. The supporting arm for the projector is capable of being pivoted down about a horizontal axis, with the result that the projector can be folded down into a protected position in front of the projection panel when not in operation.

In addition, German Utility Model DE 20 2008 002 222 U1, by the applicant of the instant application, describes a mobile presentation apparatus which has a projection panel and a projector directed at the panel. The projection panel and the projector are both fastened on a vertically adjustable supporting structure. The supporting arm for the projector contains a hinged joint, as a result of which the projector can be folded down into a protected non-operating position in front of the projection panel.

Both in the case of presentation systems which are fitted in such a way that they are fixed in position, i.e. for example on a building wall, and in the case of mobile presentation systems, i.e. ones provided for example with a movable undercarriage, it is advantageous if the presentation systems are vertically adjustable in order to be able to match the systems in each case in optimum fashion to the present conditions, and if the respective projection apparatus can be moved into a protected non-operating position.

The supporting arm protruding in front of the projection panel for the projection apparatus generally results in a lack of stability for the system. Either there is the risk of the entire presentation system tipping over when an additional weight is loaded on the supporting arm (for example as a result of a pupil hanging from it) if the supporting arm is locked in the operating position of the projection apparatus or is constructed in such a way that it is only capable of pivoting to the side, or there is the risk of the electronic presentation elements (projector, projection panel) being damaged if a supporting arm which is capable of being folded down pivots down in an uncontrolled manner when an additional weight is loaded on it.

SUMMARY OF THE INVENTION

It is accordingly an object of the invention to provide a supporting arm for a projection apparatus and a presentation apparatus having a supporting arm, which overcome the hereinafore-mentioned disadvantages and avoid the above-mentioned problems of the heretofore-known devices of this general type and which make it possible, in particular, to fold down the projection apparatus fastened thereon, but at the same time ensure increased safety for the user and the projection apparatus.

With the foregoing and other objects in view there is provided, in accordance with the invention, a supporting arm for a projection apparatus. The supporting arm comprises a first arm section, a second arm section and an articulation apparatus between the first and the second arm sections for connecting the two arm sections. It is possible for a projection apparatus (for example projector, video projector) to be fastened on a free end of the second arm section. The articulation apparatus is constructed in such a way that the second arm section is capable of rotating relative to the first arm section between a first position (operating position), in which the longitudinal axes of the two arm sections run substantially parallel to one another, and a second position (non-operating position), in which the longitudinal axes of the two arm sections run substantially at right angles with respect to one another. According to the invention, in addition a spring apparatus is provided which is coupled on one hand to the first arm section and on the other hand to the second arm section and has a spring force which is selected in such a way that it compensates for a weight force of the second arm section and of the projection apparatus fastened thereon over substantially an entire rotational excursion or path of the second arm section relative to the first arm section.

By virtue of the fact that the supporting arm is formed from the two arm sections, which are connected to one another through an articulation apparatus, and the fact that this articulation apparatus is constructed in such a way that the second arm section is capable of rotating relative to the first arm section between a first operating position, in which the longitudinal axes of the two arm sections run substantially parallel to one another, and a second non-operating position, in which the longitudinal axes of the two arm sections run substantially at right angles with respect to one another, a projection apparatus which is fastened on the second arm section can firstly be held in a predetermined operating position relative to the projection panel and secondly can be protected in a space-saving manner in a non-operating position in which it is folded down in front of the projection panel.

As a result of the special spring apparatus, which is coupled on one side to the first arm section and on the other side to the second arm section and has a spring force which is selected in such a way that it compensates for a weight force of the second arm section and of the projection apparatus fastened thereon over substantially the entire rotational excursion of the second arm section relative to the first arm section, it is also ensured that the second arm section and therefore the projection area is held in any desired position relative to the first arm section or to the projection panel without additional measures and without actually being locked or fixed in any way. The end positions of the rotational movement of the second arm section as defined by the articulation apparatus predetermine the defined operating position and non-operating position. Since the second arm section is not fixed in its first position, it can rotate immediately and without any problems into its second position (intentionally or in an undesirable manner) in the case of it being loaded by an additional weight. The second arm section therefore gives way to the additional weight force and prevents the entire supporting arm or the entire presentation apparatus on which the supporting arm is provided from giving way to this weight force and, for example, tipping over and therefore endangering the user and/or the presentation elements attached. In addition, the spring apparatus brings about a damped pivoting movement of the second arm section or of the projection apparatus, as a result of which the electronic presentation elements provided are additionally protected from damage.

In accordance with another feature of the invention, the spring apparatus is coupled to the first and the second arm sections of the supporting arm and its spring force is selected in such a way that the second arm section is held in its first position and/or its second position without any additional measures. This can be achieved, for example, by virtue of the fact that the spring force of the spring apparatus is selected to be greater than the weight force of the second arm section and of the projection apparatus fastened thereon, and the spring apparatus exerts this spring force in the respective end position in the opposite direction to the respective other position. Preferably, the second arm section is thus held in the two end positions (operating position and non-operating position).

In accordance with a further feature of the invention, the spring apparatus of the supporting arm contains at least one gas spring.

For example, one end of the gas spring is fastened rotatably on the first arm section of the supporting arm or on an element which is rigidly connected thereto, and another end of the gas spring is fastened rotatably on a second arm section of the supporting arm or on an element which is rigidly connected thereto.

In accordance with an added feature of the invention, the articulation apparatus has a guide device, which guides the rotational movement of the second arm section relative to the first arm section and delimits the rotational movement with respect to the first and/or the second position of the second arm section relative to the first arm section. This delimitation of the rotational movement of the second arm section through the use of the guide device of the articulation apparatus fixes the first position (operating position) or the second position (non-operating position) of the second arm section.

For example, the guide device has a guide groove and a cam guided in the guide groove. One end of the guide groove determines the first and second positions of the second arm section relative to the first arm section. As an alternative or in addition, a relative position of the cam to the guide groove determines the first or second positions of the second arm section relative to the first arm section. In the second case mentioned, this relative position of the cam to the guide groove is preferably adjustable, with the result that, for example, the operating position of the second arm section can be finely adjusted or readjusted.

In accordance with an additional feature of the invention, the guide groove is provided on the first arm section of the supporting arm or on an element which is rigidly connected thereto, and the guide cam is provided on the second arm section of the supporting arm or on an element which is rigidly connected thereto. In an alternative embodiment, the guide groove is provided on the second arm section of the supporting arm or on an element which is rigidly connected thereto, and the guide cam is provided on the first arm section of the supporting arm or on an element which is rigidly connected thereto.

In accordance with yet another feature of the invention, the second arm section of the supporting arm can be locked in its second, i.e. folded-down, position. This measure can be used to prevent a presentation apparatus on which the supporting arm is provided from being used by an unauthorized person.

With the objects of the invention in view, there is also provided a presentation apparatus, comprising a support, a projection panel which is fastened on the support, and a projection apparatus which is fastened on the support through a supporting arm according to the invention. The supporting arm according to the invention in this case is fastened on the support in such a way that the second arm section of the supporting arm, in its first position, positions the projection apparatus in a predetermined operating position relative to the projection panel and, in its second position, is folded down in front of the projection panel.

In accordance with another feature of the invention, the first arm section of the supporting arm runs substantially horizontally. The second arm section of the supporting arm, on one hand, in its first position, likewise runs substantially horizontally and on the other hand, in its second position, runs substantially vertically.

In accordance with a further feature of the invention, the support of the presentation apparatus is constructed or fitted in such a way that it is vertically adjustable in order to be able to variably adjust the vertical position of the presentation elements.

In accordance with a concomitant feature of the invention, the presentation apparatus can optionally be constructed to be mobile or installed fixedly.

Other features which are considered as characteristic for the invention are set forth in the appended claims.

Although the invention is illustrated and described herein as embodied in a supporting arm for a projection apparatus and a presentation apparatus having a supporting arm, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
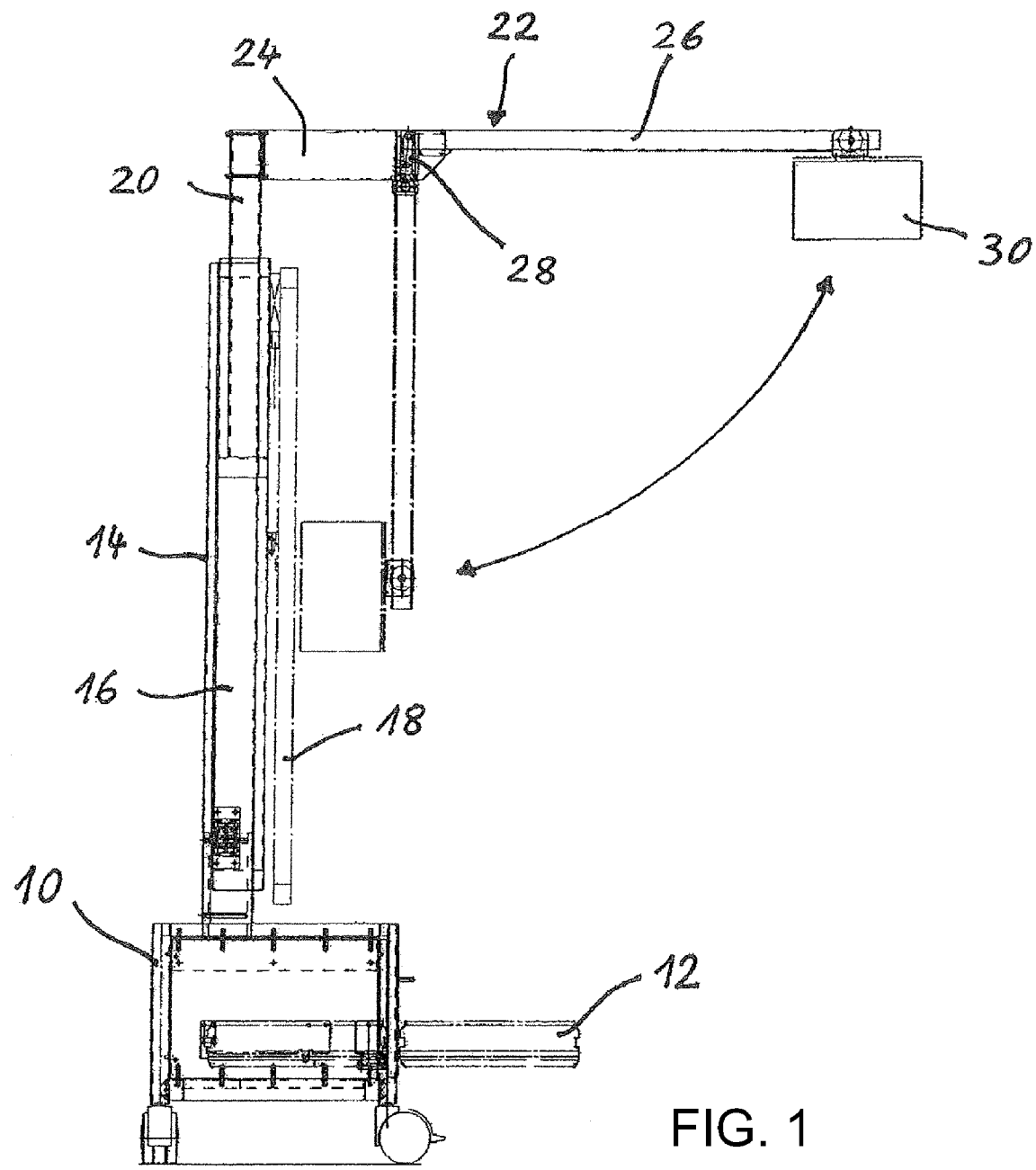
FIG. 1 is a diagrammatic, side-elevational view of a presentation apparatus with a projection panel and a projection apparatus, which is fastened on a supporting arm of the present invention.

Referring now to the figures of the drawings in detail and first, particularly, to FIG. 1 thereof, there is seen a basic construction of a mobile presentation apparatus in which a supporting arm of the invention can advantageously be used.

The presentation apparatus has a movable undercarriage 10 with a plurality of foot castors which is, for example, in the form of an item of furniture such as a shelf, sideboard or the like. As a result of the movable undercarriage 10, the presentation apparatus can be used flexibly at different locations and a dedicated presentation apparatus of this type does not need to be provided, for example, for every classroom or every lecture room.

The undercarriage 10 preferably has a plurality of receptacles 12 which are, for example, in the form of a compartment or a drawer, that can preferably be closed and additionally preferably locked. The receptacles 12 of the undercarriage 10 are used, in particular, for accommodating peripherals of presentation elements of this presentation apparatus. The peripherals include, for example, a control device, a computer, a printer or the like. In the case of interactive presentation elements, pens, pointers or the like for the activation of a projection area by the user(s) can also be mentioned as peripherals.

As is indicated in FIG. 1, one of the receptacles 12 may contain, for example, a rack/rest for a computer, a notebook or the like which is constructed to be vertically adjustable, for example through the use of gas springs. In this way, for example, a notebook rest at an optimal working height for operation is made available to the user.

In addition, electrical terminals for the presentation elements and the complete cable management system are also accommodated in the movable undercarriage 10. The electrical terminals include, in particular, terminals for power supply and for communication between the presentation elements and between the presentation elements and other devices and networks. Different and in each case a plurality of such terminals are also preferably provided.

A height positioning apparatus is disposed and fastened on this undercarriage 10. This height positioning apparatus includes, in particular, a holder or supporting structure 14 and a support 16. In the embodiment illustrated herein, the holder 14 has two parallel pylons or columns, on which the support 16 is mounted in such a way that it is capable of being displaced between a first and a second height position. The support 16 is substantially in the form of a plate or frame.

The present invention is not only restricted to this holder 14. The holder 14 may also have, for example, only one pylon or more than two pylons. Instead of pylons, other columns, posts, supporting elements or the like can also be used.

Furthermore, the present invention is also not restricted to an application in a mobile presentation apparatus. The presentation apparatus can also be fitted or mounted on a stationary element such as a wall, an item of furniture or the like through the holder 14 instead of on a movable undercarriage 10. Depending on the construction of the holder 14, the presentation apparatus is to be fitted or mounted directly on a wall or the like or to be suspended on or in a wall rail, which for its part is fastened on a wall, an item of furniture or the like. In the latter case, the entire presentation apparatus can also be displaced horizontally along the wall rail in addition to its own vertical adjustment.

In addition, the present invention can alternatively also be used in presentation apparatuses which do not have height positioning, but in which the presentation elements such as a projector and a projection panel are fitted or mounted in fixed height positions.

One or more presentation elements can be fastened on the support 16 of the height positioning apparatus. In the exemplary embodiment of FIG. 1, a projection panel 18, preferably an interactive projection panel, and a projection apparatus 30 such as a projector or video projector, for example, are fitted or mounted on the support 14. In order to fit or mount the projector 30, a vertical support 20, which is attached as a continuation of the holder 14, and a supporting arm 22 of the invention, are provided.

The supporting arm 22 substantially includes a first arm section 24, which is fastened on the vertical support 20 and runs substantially horizontally, and a second arm section 26, which is connected with one of its ends through an articulation apparatus 28 to the first arm section 24 and on another free end of which the projection apparatus 30 is fastened.

The second arm section 26 can be moved, through the articulation apparatus 28 of the supporting arm 22, between a first position (an operating position shown in continuous lines in FIG. 1) and a second position (a non-operating position shown in dash-dotted lines in FIG. 1). On one hand, in the first operating position of the second arm section 26 (see FIG. 2), longitudinal axes 25, 27 (see FIGS. 2 and 3) of the two arm sections 24, 26 run substantially parallel to one another, and the projector 30, which is fastened on the second arm section 26, is directed towards the projection panel 18 in a predetermined manner. On the other hand, in the second non-operating position of the second arm section 26 (see FIG. 3), the longitudinal axis 27 of the second arm section 26 runs substantially at right angles with respect to the longitudinal axis 25 of the first arm section 24, with the result that the projector 30 is folded downwards in front of the projection panel 18 and is therefore protected.

In particular, in the case of mobile presentation apparatuses, it is important to protect the projector 30 when not in use and to limit the overall dimensions of the apparatus for transportation. Thus, the presentation apparatus with the projector 30 folded down and protected in this non-operating position can be moved through doors with standard dimensions and takes up less space when not in use.

Figure 3:
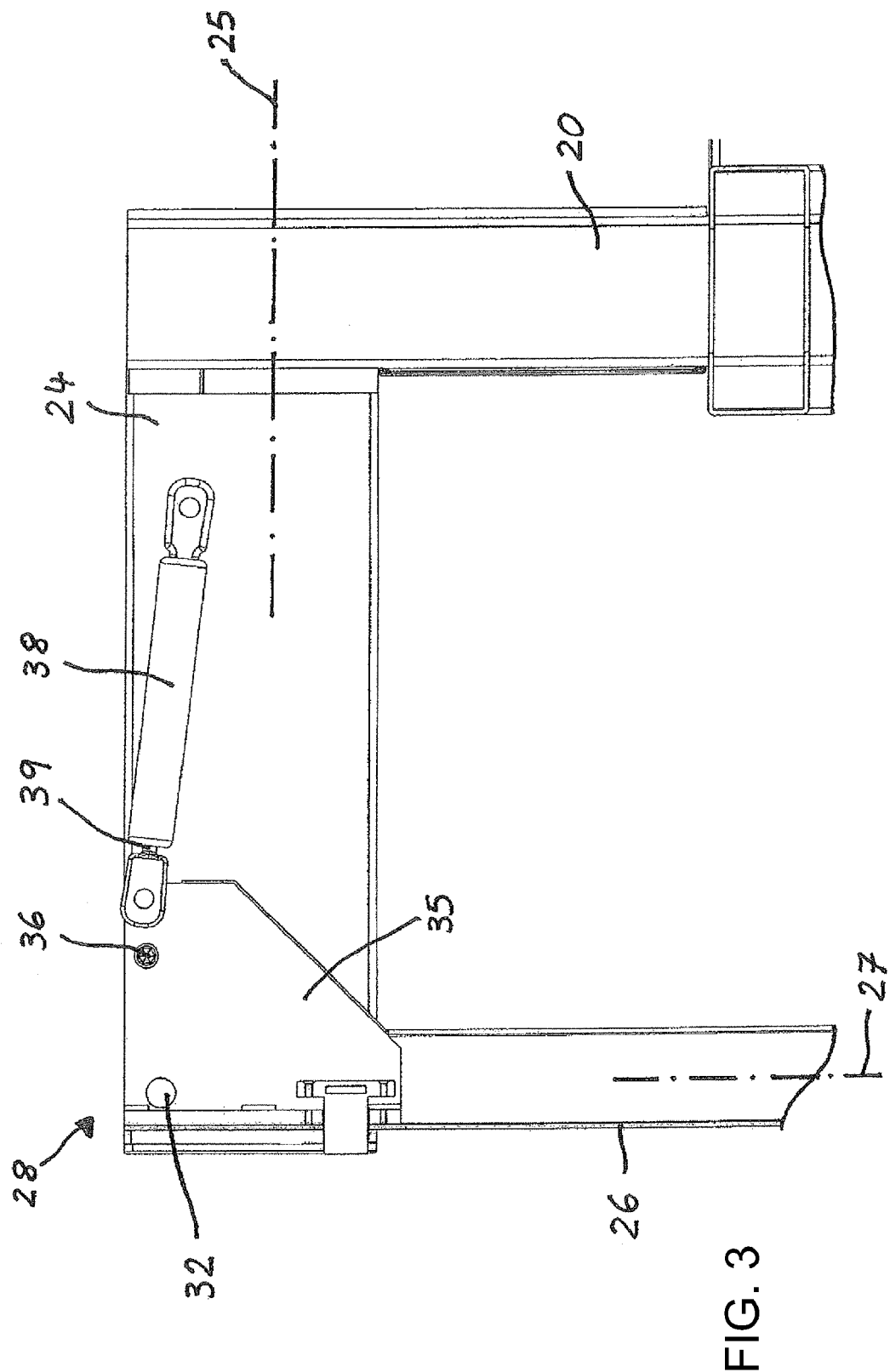
FIG. 3 is a fragmentary, side-elevational view of a supporting arm in accordance with a preferred exemplary embodiment of the invention, with the second arm section in a second position (folded-down non-operating position)

In order to ensure that use of the presentation apparatus by an unauthorized person can be prevented, the supporting arm 22 is preferably constructed in such a way that its second arm section 26 can be latched and preferably also locked in the folded-down non-operating position (FIG. 3).

In this exemplary embodiment, the presentation elements are an interactive projection panel 18 and a projector 30 directed at this projection panel 18. In the context of the invention, other presentation elements or other combinations of presentation elements can, of course, also be fastened on the support 16 of the height positioning apparatus. Other possible presentation elements are, for example, a display screen, a whiteboard, a projection panel, an integrated unit including a projection panel and a projector directed at the projection panel, a projector or the like.

While, in the exemplary embodiment of FIG. 1 of a mobile presentation apparatus with a movable undercarriage, preferably a plurality of receptacles, racks or the like are provided on this undercarriage, this is not possible in an alternative presentation apparatus of the invention which can be fitted or mounted on a wall rail, a stationary element or the like. In this case, it is advantageous if an additional device, for example in the form of a pivotable and/or vertically adjustable arm, is fitted or mounted on the holder 14 of the height positioning apparatus through which the presentation apparatus can be suspended on a wall rail, for example. The pivotable and/or vertically adjustable arm has a rack or a fastening option, for example for a notebook for driving the presentation elements 18, 30 of the presentation apparatus. The electrical terminals and communication links are correspondingly accommodated in the holder 14.

Figure 4:
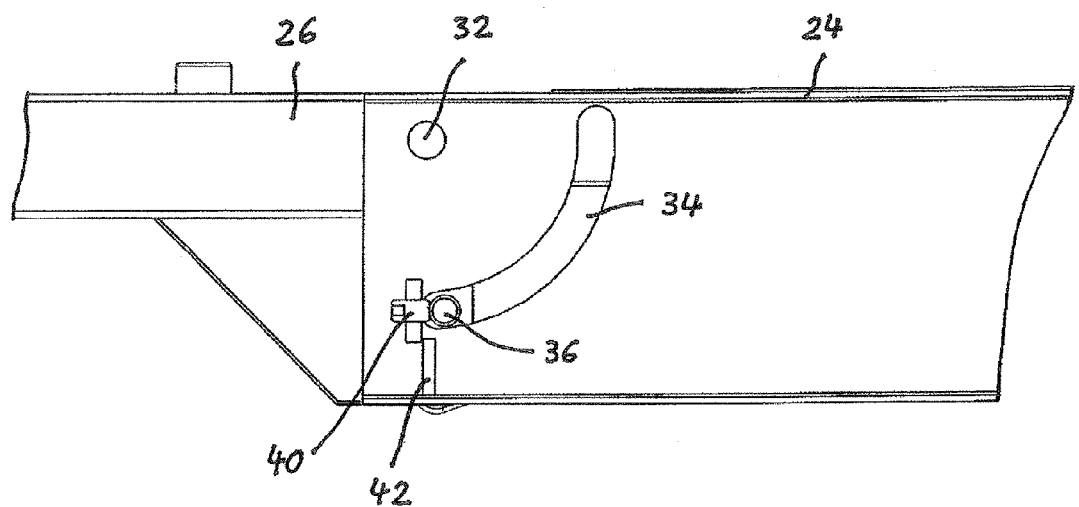
FIG. 4 is a fragmentary, side-elevational view of the supporting arm in accordance with a preferred exemplary embodiment of the invention, with a housing of an articulation apparatus removed and with a spring apparatus removed.

The construction and operation of the supporting arm 22 and its articulation apparatus 28 will now be described in more detail with reference to FIGS. 2 to 4.

The articulation apparatus 28 of the supporting arm 22 has a plate or housing 35, which is fitted or mounted in such a way that it is fixed against rotation on the second arm section 26 and is capable of rotating or pivoting about a rotary shaft provided on the first arm section 24. The rotary shaft forms a rotary spindle 32 of the articulation apparatus 28. In the fitted or mounted state of the supporting arm (see FIG. 1), this rotary spindle 32 runs substantially horizontally and substantially at right angles with respect to the longitudinal axes 25, 27 of the first and second arm sections 24, 26.

A guide groove 34 is provided on an end region of the first arm section 24 facing the articulation apparatus 28, and a guide cam 36 is fitted or mounted on the plate 35 and is guided in this guide groove 34. The guide groove 34 substantially forms a quarter circle of approximately 90° about the above-mentioned rotary spindle 32, with the result that the rotational movement of the second arm section 26 relative to the first arm section 24 can take place over a maximum of approximately 90°.

In this case, the guide groove 34 is positioned and aligned on the first arm section 24 in such a way that, in the first (end) position of the second arm section 26 (operating position shown in FIG. 2), the longitudinal axes 25, 27 of the two arm sections 24, 26 run substantially parallel to one another; i.e. in the fitted or mounted state of the supporting arm 22 as shown in FIG. 1, the two run substantially horizontally. In the second (end) position of the second arm section 26 (non-operating position shown in FIG. 3), the longitudinal axis 27 of the second arm section 26 runs substantially at right angles with respect to the longitudinal axis 25 of the first arm section 24; i.e. in the fitted or mounted state of the supporting arm 22 as shown in FIG. 1, the two run substantially vertically.

In one embodiment, the limits of the rotational movement of the second arm section 26 relative to the first arm section 24 and therefore the operating position and the non-operating position of the second arm section 26 are simply determined by the ends of the guide groove 34 against which the cam 36 guided therein hits.

In a preferred modification of this embodiment of the invention, the guide cam 36 is fastened on the plate 35 through a fastening element 40 in such a way that its position relative to the guide groove 34 can be changed. This change in the relative position can be carried out, for example, with the aid of an adjusting screw 42, which engages with a threaded section of the fastening element 40, as is illustrated in FIG. 4.

The guide cam 36 can move to a greater or lesser extent in the guide groove 34, depending on the setting of the relative position between the cam 36 and the guide groove 34. In other words, the cam 36 reaches its potential end positions in the guide groove 34 earlier or later, with these end positions defining the first operating position and the second non-operating position. In this way, in particular the first as well as the second position of the second arm section 26 relative to the first arm section 24 can be finely adjusted or readjusted during initial fitting or mounting and over the course of the operating time.

The construction of the articulation apparatus 28 is not restricted to the exemplary embodiment described above and illustrated in FIGS. 2 to 4. There are numerous developments and modifications within the scope of protection defined by the claims. In particular, various reversals in comparison with the example illustrated in FIGS. 2 to 4 are conceivable, with the result that, for example, the plate 35 can also be fastened in such a way that it is fixed against rotation on the first arm section 24, the guide groove 34 can be formed on the plate 35 or the second arm section 26, and/or the guide cam 36 can be provided on the first arm section 24 or on the second arm section 26. In addition, it is also conceivable for the plate 35 to be constructed to be integral or in one piece with the second arm section 26 or the first arm section 24.

In addition to this articulation apparatus 28 between the two arm sections 24 and 26 of the supporting arm 22, a special spring apparatus is furthermore provided on the supporting arm 22 according to the invention.

Figure 2:
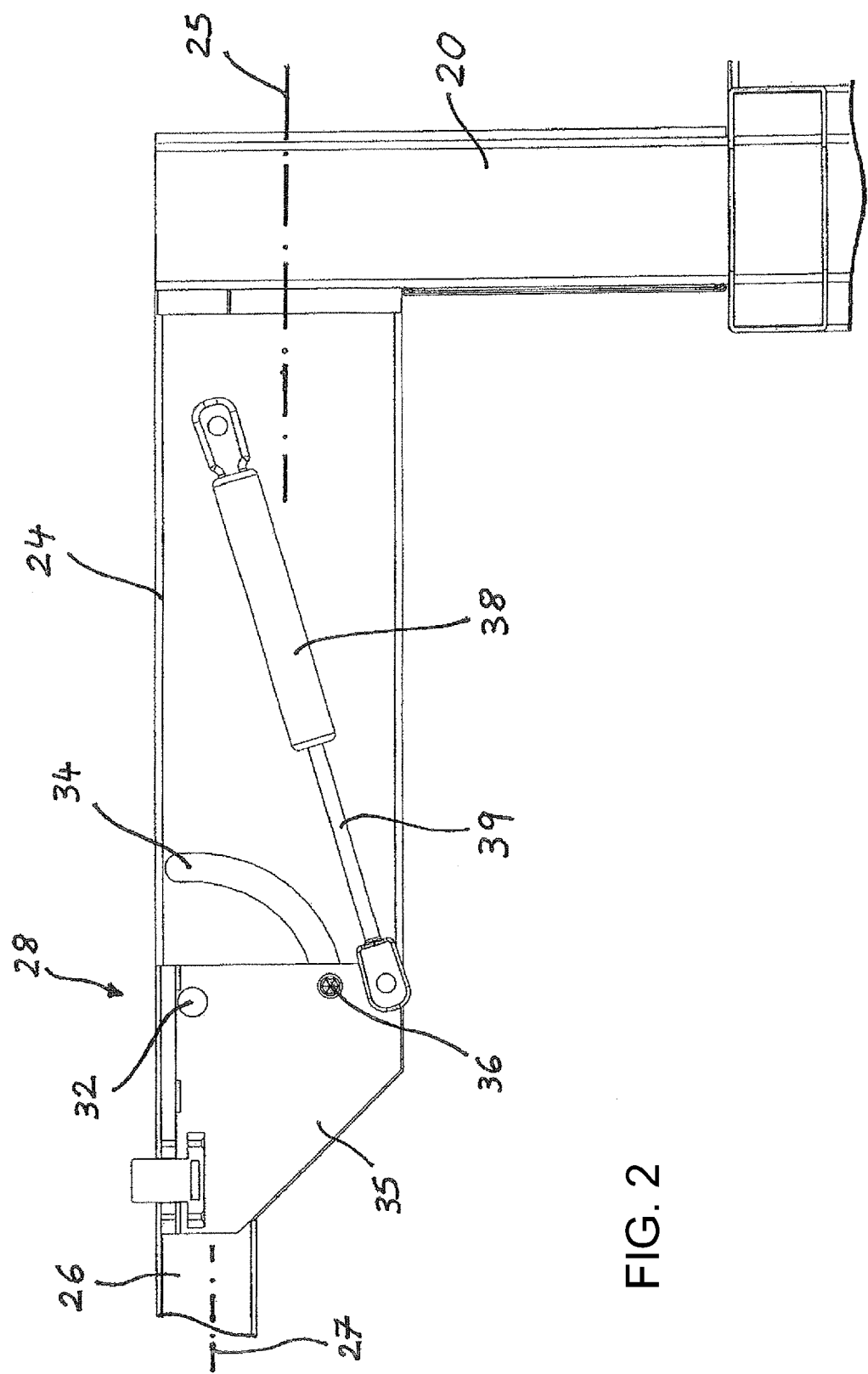
FIG. 2 is an enlarged, fragmentary, side-elevational view of a supporting arm in accordance with a preferred exemplary embodiment of the invention, with a second arm section in a first position (operating position)

In the exemplary embodiment of FIGS. 2 and 3, this spring apparatus is formed by a gas spring 38. One end (on the right-hand side in FIGS. 1 and 2) of this gas spring 38 is fastened rotatably on the first arm section 24. The other end (on the left-hand side in FIGS. 1 and 2) of the gas spring 38 is fastened rotatably on the plate 35, which is connected in such a manner as to be fixed against rotation to the second arm section 26. The fastening position of this other end of the gas spring 38 in this case is selected to be outside the rotary spindle 32, with the result that the gas spring 38 likewise rotates slightly about the rotary spindle 32 relative to the first arm section 24 during a rotational movement of the second arm section 26 and in the process its piston rod is withdrawn or extended.

The gas spring 38 is distinguished by the fact that it provides a relatively constant spring force over a large excursion area of the piston rod. According to the invention, this spring force is greater than a weight force of the second arm section and of the projection apparatus 30 fastened thereon. As a result, the gas spring 38 compensates for this weight force over substantially the entire pivoting range of the second arm section 26 relative to the first arm section 24. In this way, the pivoting movement of the second arm section 26 relative to the first arm section 24 takes place in damped fashion. In other words, intentional and undesired rapid movements of the second arm section 26 are prevented, which in turn protects the electronic presentation elements such as the projection panel 18 and the projector 30 from damage.

As can be seen in FIGS. 2 and 3, the gas spring 38 is fastened with one of its ends (on the left-hand side in the figures) in such a position on the plate 35 that its piston rod 39 is extended at least slightly both in the first position and in the second position of the second arm section 26 relative to the first arm section 24 and, in the event of a movement of the second arm section 26 between the two end positions, is moved beyond a position in which it is mostly withdrawn. Thus, the gas spring 38 is inclined downwards to the left in the first position of the second arm section 26 (FIG. 2) and is inclined upwards slightly to the left in the second position in FIG. 3, with the piston rod 39 of the gas spring 38 being mostly withdrawn in the horizontal alignment of the gas spring 38.

This means that the spring force of the gas spring 38 in the two end positions of the second arm section 26 presses the second arm section 26 in the direction away from the respective other position. The second arm section 26 is therefore held both in its first position (FIG. 2) and in its second position (FIG. 3) through the use of the gas spring 38 without any additional measures. The spring force of the gas spring 38 in this case should not be selected to be excessively high in order to ensure that the second arm section 26 can be moved by a user between its two end positions relative to the first arm section 24 of the supporting arm 22 without an excessive expenditure of force.

With respect to this spring apparatus 38 as well, the present invention is not restricted to the exemplary embodiment illustrated in FIGS. 2 and 3 and there are numerous developments and modifications within the scope of protection defined by the claims.

For example, the gas spring 38 can alternatively also be fastened on the first arm section 24 and on the second arm section 26. If the plate 35 is fitted or mounted in such a manner as to be fixed against rotation on the first arm section 24, the gas spring 38 is connected firstly to the second arm section 26 and secondly to the plate 35 or the first arm section 24. Also, the piston rod of the gas spring 38 does not necessarily need to be extended in the first position of the second arm section 26, as illustrated in FIG. 2, but can also be withdrawn given a corresponding positioning of the piston rod end on the plate 35 and extended in its second position (FIG. 3) in the event of a rotational movement of the second arm section 26.

In addition, two or more gas springs 38 can also be provided on the supporting arm 22, in which case the gas springs 38 are fitted parallel to one another on the supporting arm 22. If the supporting arm 22 substantially includes one component in its longitudinal direction, two gas springs 38, for example, can be fitted on both sides of this one component (possibly including a combination of the guide groove 34 and the guide cam 36 fitted or mounted on both sides). If the supporting arm 22 includes a plurality of parallel components in its longitudinal direction, however, each of these components of the plurality of components can be equipped with a gas spring 38 and/or a guide device 34, 36, for example. The use of a plurality of gas springs or of twin springs further increases the operational reliability of the supporting arm.

In order to avoid or minimize risk of injury to the user of the supporting arm 22 or the presentation apparatus, the articulation apparatus 28 and the spring apparatus 38 of the supporting arm 22 are preferably provided with non-illustrated covers, as a result of which there is an encapsulated construction.

The invention claimed is:

1. A supporting arm for a projection apparatus, the supporting arm comprising:
    a first arm section having a longitudinal axes;
    a second arm section having a longitudinal axes and a free end;
    the projection apparatus to be fastened on said free end of said second arm section;
    an articulation apparatus disposed between said first and second arm sections for interconnecting said arm sections, said articulation apparatus being configured to permit said second arm section to rotate through a rotational excursion relative to said first arm section between a first position, in which said longitudinal axes of said arm sections run substantially parallel to one another, and a second position, in which said longitudinal axes of said arm sections run substantially at right angles relative to one another, said articulation apparatus having a guide device guiding a rotational movement of said second arm section relative to said first arm section and delimiting said rotational movement relative to one of said first or second positions of said second arm section relative to said first arm section; and
    a spring apparatus coupled to said first arm section and to said second arm section and having a spring force selected to compensate for a weight force of said second arm section and of the projection apparatus fastened thereon over substantially all of said rotational excursion of said second arm section relative to said first arm section.

2. The supporting arm according to claim 1, wherein said spring force of said spring apparatus coupled to said first and second arm sections is selected to permit said spring apparatus to hold said second arm section in at least one of said first or second positions.

3. The supporting arm according to claim 1, wherein said spring apparatus contains at least one gas spring.

4. The supporting arm according to claim 3, wherein said at least one gas spring has one end fastened rotatably on said first arm section or on an element rigidly connected thereto and another end fastened rotatably on said second arm section or on an element rigidly connected thereto.

5. The supporting arm according to claim 1, wherein said guide device has a guide groove and a cam guided in said guide groove, and said guide groove has one end determining said first or second position of said second arm section relative to said first arm section.

6. The supporting arm according to claim 5, wherein said guide groove is provided at said first arm section or an element rigidly connected thereto, and said guide cam is provided on said second arm section or on an element rigidly connected thereto.

7. The supporting arm according to claim 5, wherein said guide groove is provided at said second arm section or on an element rigidly connected thereto, and said guide cam is provided on said first arm section or on an element rigidly connected thereto.

8. The supporting arm according to claim 1, wherein said guide device has a guide groove and a cam guided in said guide groove, and a relative position of said cam relative to said guide groove determines said first or second position of said second arm section relative to said first arm section.

9. The supporting arm according to claim 8, wherein said relative position of said cam to said guide groove is adjustable.

10. The supporting arm according to claim 8, wherein said guide groove is provided at said first arm section or an element rigidly connected thereto, and said guide cam is provided on said second arm section or on an element rigidly connected thereto.

11. The supporting arm according to claim 8, wherein said guide groove is provided at said second arm section or on an element rigidly connected thereto, and said guide cam is provided on said first arm section or on an element rigidly connected thereto.

12. The supporting arm according to claim 1, wherein said second arm section is configured to be latched or locked in said second position.

13. A presentation apparatus, comprising:
    a support;
    a projection panel fastened on said support;
    a projection apparatus; and
    a supporting arm fastening said projection apparatus on said support, said supporting arm having:
        a first arm section having a longitudinal axes,
        a second arm section having a longitudinal axes and a free end,
        said projection apparatus to be fastened on said free end of said second arm section,
        an articulation apparatus disposed between said first and said second arm sections for interconnecting said arm sections, said articulation apparatus being configured to permit said second arm section to rotate through a rotational excursion relative to said first arm section between a first position, in which said longitudinal axes of said arm sections run substantially parallel to one another, and a second position, in which said longitudinal axes of said arm sections run substantially at right angles relative to one another, said articulation apparatus having a guide device guiding a rotational movement of said second arm section relative to said first arm section and delimiting said rotational movement relative to one of said first or second positions of said second arm section relative to said first arm section; and a spring apparatus coupled to said first arm section and to said second arm section and having a spring force selected to compensate for a weight force of said second arm section and of said projection apparatus fastened thereon over substantially all of said rotational excursion of said second arm section relative to said first arm section; and said supporting arm being fastened on said support to permit said second arm section to position said projection apparatus in a predetermined operating position relative to said projection panel in said first position and to fold down in front of said projection panel in said second position.

14. The presentation apparatus according to claim 13, wherein said first arm section runs substantially horizontally, and said second arm section runs substantially horizontally in said first position and substantially vertically in said second position.

15. The presentation apparatus according to claim 13, wherein said support is constructed or fitted to be vertically adjustable.

16. The presentation apparatus according to claim 13, wherein the presentation apparatus is configured to be mobile.

17. The presentation apparatus according to claim 13, wherein the presentation apparatus is installed fixedly.

* * * * *